(12) United States Patent
Jansen et al.

(10) Patent No.: US 8,649,365 B2
(45) Date of Patent: Feb. 11, 2014

(54) DEDICATED SYNCHRONIZATION SIGNAL FOR OFDMA SYSTEM

(75) Inventors: Kaj Jansen, Salo (FI); Sari Nielsen, Espoo (FI)

(73) Assignee: Nokia Corporation, Espoo (FI)

( * ) Notice: Subject to any disclaimer, the term of this patent is extended or adjusted under 35 U.S.C. 154(b) by 854 days.

(21) Appl. No.: 11/649,814

(22) Filed: Jan. 5, 2007

(65) Prior Publication Data

US 2007/0202902 A1 Aug. 30, 2007

Related U.S. Application Data

(60) Provisional application No. 60/756,559, filed on Jan. 6, 2006.

(51) Int. Cl.
*H04J 3/06* (2006.01)
*H04B 7/212* (2006.01)
*H04W 4/00* (2009.01)

(52) U.S. Cl.
USPC .............................. 370/350; 370/324; 370/331

(58) Field of Classification Search
USPC .......... 370/324, 350, 329–334; 455/502, 517, 455/13.2, 434, 515, 436–444
See application file for complete search history.

(56) References Cited

U.S. PATENT DOCUMENTS

| | | | | |
|---|---|---|---|---|
| 5,640,414 | A * | 6/1997 | Blakeney et al. | 375/130 |
| 6,744,747 | B2 * | 6/2004 | Shiu et al. | 370/331 |
| 7,095,811 | B1 * | 8/2006 | Shikh-Bahaei et al. | 375/340 |
| 7,173,899 | B1 * | 2/2007 | Rupp | 370/208 |
| 7,190,748 | B2 * | 3/2007 | Kim et al. | 375/345 |
| 2003/0072255 | A1 * | 4/2003 | Ma et al. | 370/208 |
| 2004/0057414 | A1 * | 3/2004 | Sriram | 370/342 |
| 2004/0161020 | A1 * | 8/2004 | Mathew et al. | 375/149 |
| 2004/0228393 | A1 * | 11/2004 | Chen et al. | 375/150 |
| 2004/0248602 | A1 * | 12/2004 | Demir et al. | 455/502 |
| 2006/0030322 | A1 * | 2/2006 | Kim et al. | 455/436 |
| 2010/0098031 | A1 * | 4/2010 | Charbit | 370/336 |

FOREIGN PATENT DOCUMENTS

WO 2007/036039 4/2007

OTHER PUBLICATIONS

Monitoring of Paging Information for Evolved UTRA Scalable Bandwidth, Source: Sharp, 3GPP TSG RAN WG1 #43 R1-051340 Nov. 7-11, 2005, pp. 1-4, See p. 3; p. 4.*
Physical Channel Concept for Scalable Bandwidth in Evolved UTRA Downlink, NTT DoCoMO; 3GPP TSG RAN WG1 Ad Hoc on LTE, R1-050592, Jun. 20-21, 2005, pp. 1-14, see figure 5.*
Physical Channels and Multiplexing in Evolved UTRA Downlink, NTT DoCoMo; 3GPP TSG RAN WG1 Ad Hoc on LTE, R1-050590, Jun. 20-21, 2005.*
Downlink Synchronization Channel Schemes for E-UTRA, Texas Instruments; 3GPP TSG RAN WG1#42bis, R1-051057, Oct. 10-14, 2005.*

(Continued)

*Primary Examiner* — George Eng
*Assistant Examiner* — Marcus Hammonds
(74) *Attorney, Agent, or Firm* — Squire Sanders (US) LLP (57) ABSTRACT

A mobile node, method, apparatus and system for neighbor cell identification and measurements in a wireless network. A first synchronization signal is provided a first base station, wherein the received first synchronization signal is on a predetermined frequency of a transmission bandwidth. Initial synchronization is performed. A second synchronization signal is provided, wherein the second synchronization signal is outside of the predetermined frequency of the transmission bandwidth. Neighbor cell identification based on the received second synchronization signal.

19 Claims, 5 Drawing Sheets

(56) References Cited

OTHER PUBLICATIONS

Wang, Y.-P.E.; Ottosson, T.; , "Cell search in W-CDMA," Selected Areas in Communications, IEEE Journal on , vol. 18, No. 8, pp. 1470-1482, Aug. 2000.*
Physical Channel Concept for Scalable Bandwidth in Evolved UTRA Downlink, NTT DoCoMo; #GPP TSG RAN WG1 Ad Hoc on LTE, R1-050592, Jun. 20-21, 2005.*
Monitoring of Paging Information for Evolved UTRA Scalable Bandwidth, Source: Sharp, 3GPP TSG RAN WGI #43 R1-051340, Nov. 7-11, 2005, pp. 1-4, See p. 3; p. 4, line 14-line 24.
Physical Channel Concept for Scalable Bandwidth in Evolved UTRA Downlink, NTT DoCoMo; 3GPP TSG RAN WGI Ad Hoc on LTE, R1-050592, Jun. 20-21, 2005, pp. 1-14, see figure 5.
Extended European Search Report dated Jul. 18, 2013 in corresponding EP Application No. 07700453.9.
NOKIA, "Cell Search procedure for initial synchronization and neighbour cell identification", 3GPP TSG RAN WG 1 Meeting #43, vol. R1-051549, Nov. 7, 2005,Seoul, Korea, 6 pages, XP003011333.
NTT DoCoMo, "Physical Channels and Multiplexing in Evolved UTRA Downlink", 3GPP TSG RAN WG1 Ad Hoc on LTE, vol. R1-050590, Jun. 20, 2005, Sophia Antipolis, France, Retrieved from the Internet: URL: http://www.3gpp.org/ftp/tsg_ran/wgl_r11/TSGR_AH/, retrieved on Jun. 27, 2013, 24 pages, XP-002699699.

\* cited by examiner

DEDICATED SYNCHRONIZATION SIGNAL FOR OFDMA SYSTEM

CROSS-REFERENCE TO RELATED APPLICATIONS

This application claims priority of U.S. Provisional Patent Application Ser. No. 60/756,559 filed on Jan. 6, 2006. The subject matter of this earlier filed application is hereby incorporated by reference.

BACKGROUND OF THE INVENTION

1. Field of the Invention

The present application relates to neighbor cell search in a wideband cellular network.

2. Description of the Related Art

Orthogonal frequency division multiple access (OFDMA), also referred to as Multiuser-OFDM, is a modulation and multiple access method for 4th generation wireless networks. OFDMA is an extension of Orthogonal Frequency Division Multiplexing (OFDM), for wireless broadband access systems.

OFDMA allows multiple users to transmit simultaneously on the different subcarriers per OFDM symbol. Since the probability that all users experience a deep fade in a particular subcarrier is very low, it can be assured that subcarriers are assigned to the users who see good channel gains on them.

E-UTRA (Evolved UMTS Terrestrial Radio Access) is 3GPP radio-access technology. The objective of E-UTRA is to develop a framework for the evolution of the 3GPP radio-access technology towards a high-data-rate, low-latency and packet-optimized radio-access technology.

In previous generation wireless systems, a synchronization channel (SCH) was needed for cell search that consisted of two channels, the primary (PSC) and secondary synchronization channels. The SCH is a logical channel used by mobile stations to achieve time synchronization with the network.

SUMMARY OF THE INVENTION

A mobile node is provided according to an exemplary embodiment of the present invention. A receiver unit is configured to receive a first synchronization signal. A synchronization unit is configured to provide initial synchronization with a network. The receiver unit is further configured to receive a second synchronization signal. wherein the mobile node is further configured to perform neighbor cell identification based at least on the second synchronization signal.

A method is provided according to an exemplary embodiment of the present invention. A first synchronization signal is provided from a base station to a mobile node. A second synchronization signal is provided from the base station to the mobile node. Neighbor cells in a network are identified based at least on the second synchronization signal. The mobile node is synchronized with the identified neighbor cells.

An apparatus is provided according to an exemplary embodiment of the present invention. At least one receiving means receives a first synchronization signal from a base station and a second synchronization signal from a base station. A synchronization means performs initial synchronization with a network. An identification means identifies a neighbor cell based at least on the second synchronization signal. The apparatus is arranged to provide synchronization with the identified neighbor cell.

A base station (BS) is provided according to an exemplary embodiment of the present invention. A transmitter is configured to transmit a first synchronization signal. The transmitter is configured to transmit at least one second synchronization signal, wherein the at least one second synchronization signal is at a bandwidth (BW) outside of a predetermined portion of an operating bandwidth of a network.

A system is provided according to an exemplary embodiment of the present invention. The system includes a plurality of cells in a network. A base station includes a transmitter that is configured to transmit a first synchronization signal, and is further configured to transmit at least one second synchronization signal. The system further includes a mobile node, wherein a receiver unit is configured to receive the first synchronization signal, and is configured to receive one of the at least one synchronization signal. The mobile node identifies the cells in the network based at least on the received second synchronization signal.

BRIEF DESCRIPTION OF THE DRAWINGS

For the present invention to be easily understood and readily practiced, various embodiments will now be described, for purposes of illustration and not limitation, in conjunction with the following figures.

DETAILED DESCRIPTION OF THE PREFERRED EMBODIMENTS

As proposed for future generation wireless systems, a base station would use a primary synchronization code/synchronization channel (PSC/SCH), which is common to all base stations for synchronization. The PSC/SCH would use a predetermined portion of the entire operating bandwidth to provide synchronization, cell search and cell acquisition. For example, in an exemplary embodiment the PSC/SCH would use a center part of the operating bandwidth. Thus, the present invention allows narrowband mobile nodes to operate in wideband networks.

For example, consider the scenario where a base station has a downlink (DL) operating bandwidth that is larger than the minimum UE DL bandwidth in instances where, for example, the network uses advanced scheduling and interference control mechanisms. In this scenario, the UE may not be allocated reception bandwidth in the middle of the operating bandwidth, thus, the UE may not be able to receive the primary synchronization channel of the neighboring base station at the same time as the data.

For efficient initial synchronization and neighbor cell search in a synchronized system, a synchronization channel should be defined that is common for all cells in the system, such as primary synchronization channel (P-SCH) in WCDMA. A common synchronization channel is especially important as E-UTRAN is required to support a frequency reuse=1. Reuse=1 indicates that all of the cells of a given system are using the same frequency. As a result, there may be strong inter-cell interference at the edge of a cell within the system. Thus, a E-UTRAN system should be designed such that it is fully functional at the edge of a cell under strong interference. Further, a common synchronization channel would allow the user equipment (UE) to find new cells quickly while moving in the network.

In the initial synchronization, the UE does not need to perform a bandwidth scan to distinguish whether bandwidths such as 1.25, 2.5, 5, 10, 15 or 20 MHz bandwidth is used in a given cell even if the UE supports multiple bandwidth options. Hence, a synchronization channel can be based on the smallest 1.25 MHz bandwidth.

Still further, the synchronization channel can be transmitted regularly enough to ensure that the system will perform well in different radio conditions and with different velocities. The common channel structure of E-UTRA is designed so that it also enables efficient handover from other systems like wideband code division multiple access (WCDMA) and global system for mobile communications (GSM). In order to allow the same time multiplexed inter-radion access technologies (RAT) measurement strategy to be used in GSM for E-UTRA measurements as currently used for WCDMA measurements it is important to consider GSM TDMA frame structure when deciding the repetition rate of E-UTRA synchronization channel. This basically means that the synchronization channel needs to be repeated at least once in 4.6 ms or less, and preferably the transmission would evenly distributed over the 10 ms frame. If e.g. the synchronization channel is transmitted once in every $4^{th}$ or $5^{th}$ sub-frame, an integer multiple of repetitions per 10 ms frame is obtained. In case of 1.25 MHz bandwidth, which is the worst case, this would mean for short cyclic prefix, an overhead of 2.9% and 3.6% respectively and 3.4% and 4.3% for long cyclic prefix. In the overhead calculations the whole OFDM symbol is reserved for the synchronization channel.

In order to avoid blind bandwidth selection during initial synchronization the UE is provided information on the operating bandwidth of a given cell based on that same 1.25 MHz bandwidth. This is provided by transmitting, at least partially, system information using the 1.25 MHz bandwidth.

One solution is for the network to provide simultaneous uplink and downlink idle (UL/DL) periods for intra-frequency neighbour cell measurement purposes. Simultaneous uplink and downlink idle periods are needed for inter-frequency and inter-RAT (WCDMA and GSM) measurements but it would not be beneficial from the system perspective that the UE also needs UL/DL idle periods for performing basic intra-frequency handovers, which occur a lot more frequently than inter-frequency or inter-RAT measurements in the frequency reuse system.

However, the above system would create a problem for terminals whose bandwidth capability is smaller than the operating bandwidth of the serving BASE STATION and also neighbor base stations in the same carrier frequency, i.e. intra-frequency neighbor base stations, if that type of a terminal is configured to use, for demodulation purposes, a portion of the bandwidth other than the centre part of the operating bandwidth of the serving base station. The problem exists because a user equipment with smaller bandwidth capability than the operating bandwidth of the base station would not be able to detect the synchronization channels (for example, PSC or SCH) of the neighboring base stations while receiving data from the serving base station if the synchronization channel broadcast in the centre part of the base station operating bandwidth would not be within the bandwidth that the user equipment uses for data demodulation. This problem is illustrated further in FIG. 1.

Figure 1:
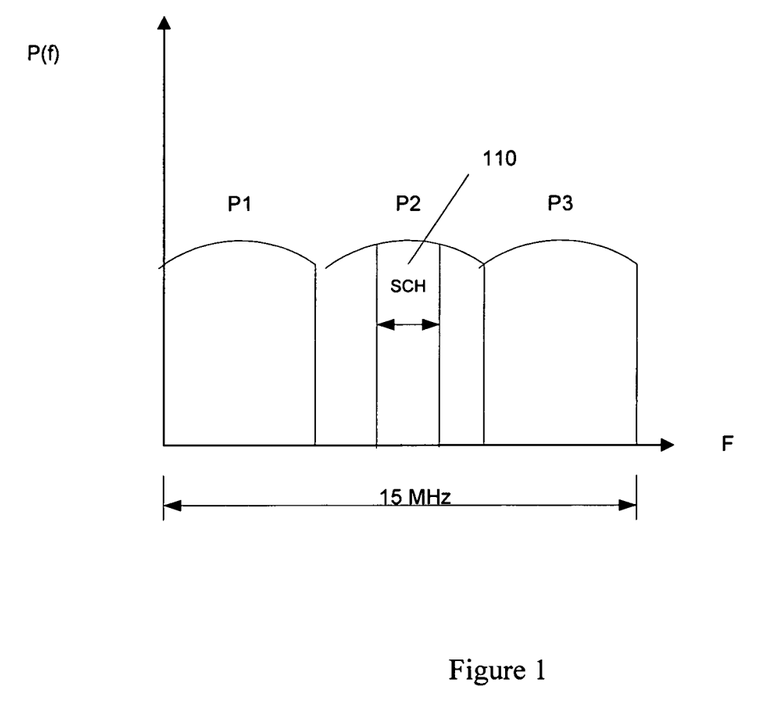
FIG. 1 illustrates that the base station has three different 5 MHz resource blocks within its 15 MHz operating bandwidth.

FIG. 1 illustrates that the base station has three different 5 MHz resource blocks within its 15 MHz operating bandwidth. In this example the SCH 110 is 1.25 MHz, and is in the center of the operating bandwidth of 15 MHz. However, the user equipment's is allocated to P3 and the user equipment's capability of receiving data is 5 MHz. Therefore, the user equipment would not be able to detect the synchronization channels SCH of the neighboring base stations.

Other solutions would be to provide user equipments with a separate receiver, implement maximum bandwidth capability to the UE, or the network provides simultaneous UL and DL idle periods. However, the first two options would be costly and the UL and DL idle periods are already needed for inter-frequency and inter-RAT measurements.

Further, the UE may need to perform intra-frequency neighbor cell identifications and measurements in parallel to the data reception for supporting fast evaluation of new neighbors for handover purposes.

According to exemplary embodiments of the present invention, another synchronization signal called a dedicated primary search code (DPSC) can be used. The DPSC signal is outside the center part of transmission bandwidth to enable cell search for cell reselections and handoffs. According to an exemplary embodiment of the invention, the DPSC, similar to the primary synchronization channel (PSC), repeats every Xth sub-frame, and occupies a certain amount of sub-carriers, but would be in transmitted a different sequence in the frequency domain, so that the UE would not detect it during the initial synchronization. Further, while PSC typically indicates where sys_info can be found, the DPSC would not contain this information according to an embodiment of the present invention.

In another embodiment of the present invention, the UE would receive restricted system information on the DPSC band, based upon the timing of the DPSC signal. Conventionally, the PSC/SCH signal points out where system information (sys_info) can be found. However, in cases where the PSC/SCH signal is outside of the UE's capability, as discussed above, the system information is on the wrong frequency band with respect to the UE. Thus, according to embodiments of the present invention the system information can be found via the DPSC signal.

According to an example of the present invention, the location of the system information is indicated by the DPSC. This system information includes, but is not limited to, restricted system information (sys_info), a System Frame Number (SFN), or some other message that is known in the art.

Figure 2:
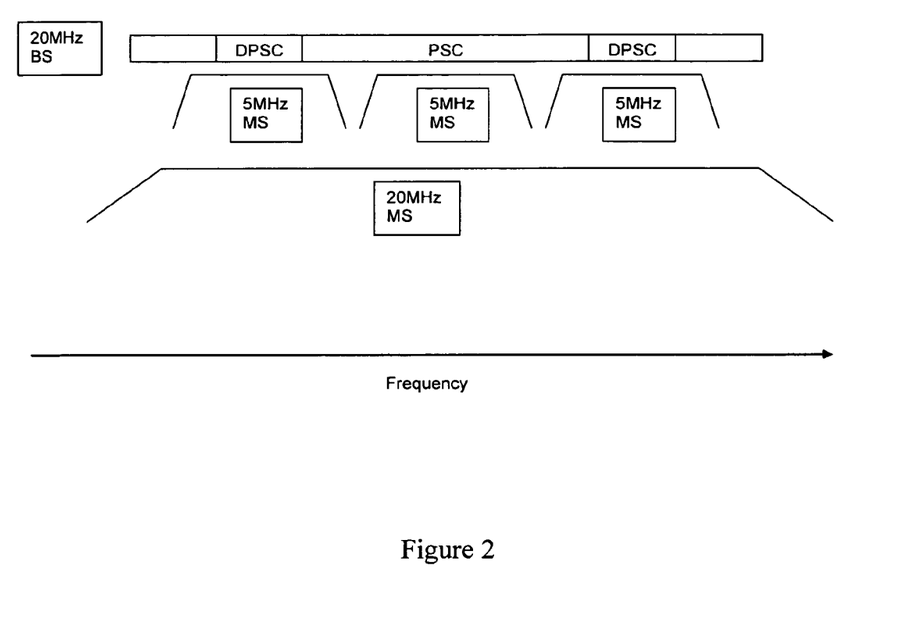
FIG. 2 illustrates an exemplary structure of the present invention.

FIG. 2 illustrates an exemplary structure of the present invention. As illustrated in FIG. 2, a base station (BS) having an operation bandwidth of 20 MHz, transmits the PSC signal in the predetermined frequency, in this example, the center frequency. However, three of the mobile stations (MS) have operating bandwidths of 5 MHZ, and would not be able to receive the PSC signal in the center frequency. However, according to the present invention, the base station BS also transmits the DPSC signals outside of the predetermined frequency of the operating bandwidth. Thus, for example, the three 5 MHz MSs can remain on their allocated frequency and receive the synchronization signals without having to switch to the center frequency to receive the PSC/SCH signal.

According to other embodiments of the present invention, the number of DPSCs would depend on the expected number of narrowband mobile stations. The DPSCs are broadcast from BSs in a similar manner as PSC. The transmission of PSC on the other hand is similar as the transmission of Primary synchronisation channel in WCDMA.

Figure 3:
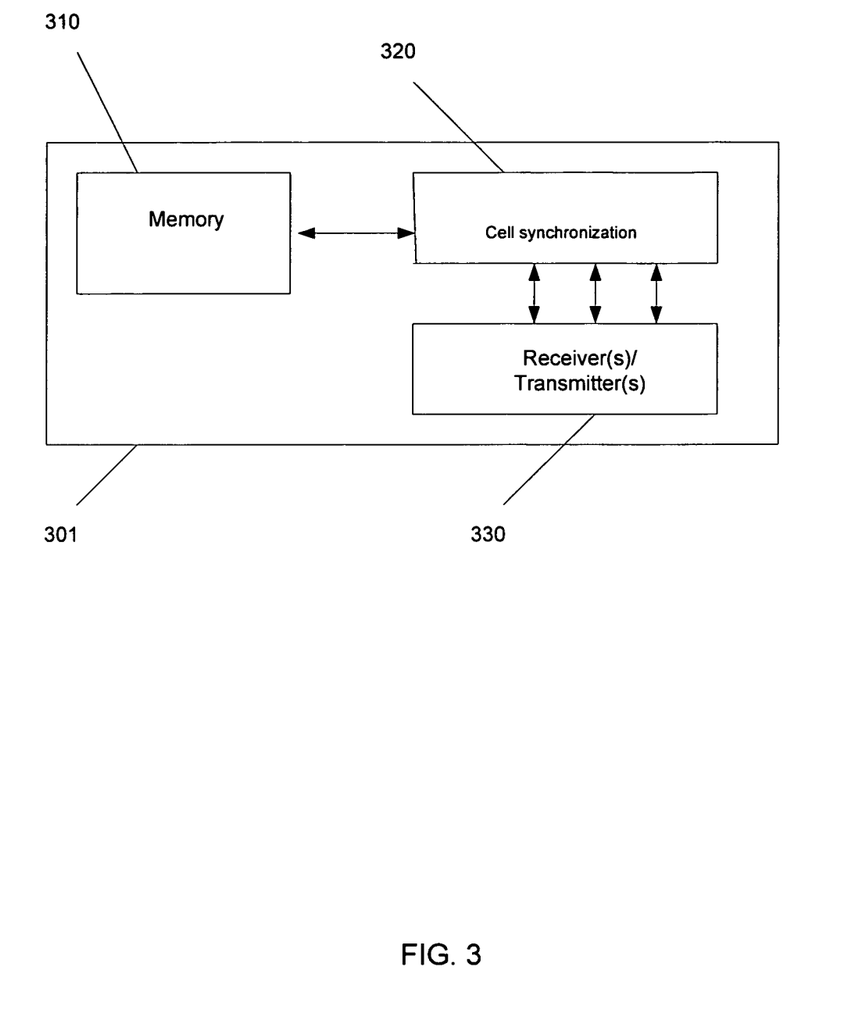
FIG. 3 illustrates a mobile node according to an exemplary embodiment of the present invention.

FIG. 3 illustrates a mobile node according to an exemplary embodiment of the present invention. The mobile node 301 may also be in the form of user equipment that is suitable for use in a wireless network environment. According to this embodiment of the invention, the mobile node includes a memory 310 or other means for storage. The memory 310 can be implemented in different ways. For example, the memory may be a part of the general memory of the mobile station. In addition, the memory, can be a separate dedicated area such as a subscriber identity module (SIM). The memory 310 can also be implemented in other ways that are well-known in the art.

The mobile station 301 according to this exemplary embodiment of the invention, also includes a receiver 320. The receiver 320 may be implemented as either a single unit or means, or as part of a transmitter/receiver (transceiver) unit 330 or means. According to this embodiment, the receiver 320 is configured to receive a first synchronization signal from a serving base station. For example, the receiver 320 may use a primary code/synchronization channel (PSC/SCH) for synchronization. The PSC/SCH would use a predetermined part of the transmission bandwidth to provide synchronization, cell search and cell acquisition.

The receiver 320 is further configured to receive a second synchronization signal such as the DPSC. As discussed above the DPSC utilizes a predetermined portion of the entire transmission bandwidth. According to this exemplary embodiment, the mobile node can use the DPSC for synchronization, cell search and cell acquisition. Thus, the receiver 320 can receive system information if the bandwidth of the mobile station is not within the bandwidth of the first synchronization signal.

According to another exemplary embodiment of the present invention, the mobile node 301 may include two receivers. One of the receivers may be utilized for receiving the DPSC signal or another synchronization signal.

Figure 4:
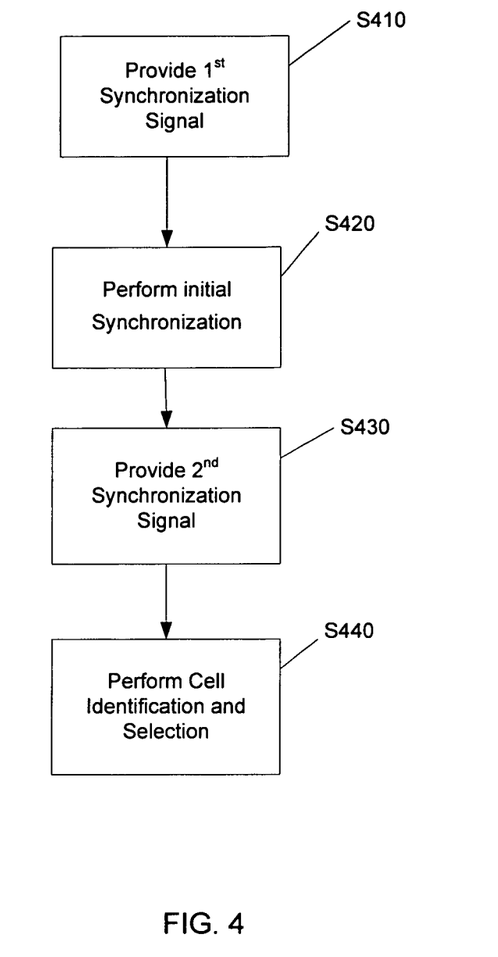
FIG. 4 illustrates a flow diagram of a method according to an exemplary embodiment of the present invention.

FIG. 4 illustrate a flow diagram that illustrates a method according to an exemplary embodiment of the present invention. At S410 the first synchronization signal is provided. The first synchronization signal may be provided, for example, from a BS to a mobile node. At S420, initial synchronization is provided. Initial synchronization may be an initial cell search either during a mobile node power up, or when entering a coverage area.

At S430 a second synchronization signal is provided. The second synchronization signal is outside of a predetermined portion of the operating bandwidth of a network, such as a cellular network. The second synchronization signal may contain information for According to some embodiments, the predetermined portion of the invention is a center frequency of the operating bandwidth. The second synchronization signal may contain system information, for example, for cell reselection. According to other exemplary embodiments of the present invention, a plurality of second synchronization signals may be provided, the number of which may be based for example, at least on the number of narrowband mobile nodes are in the system.

At S440, cell identification and subsequent cell selection may performed, based at least on the second synchronization signal.

Figure 5:
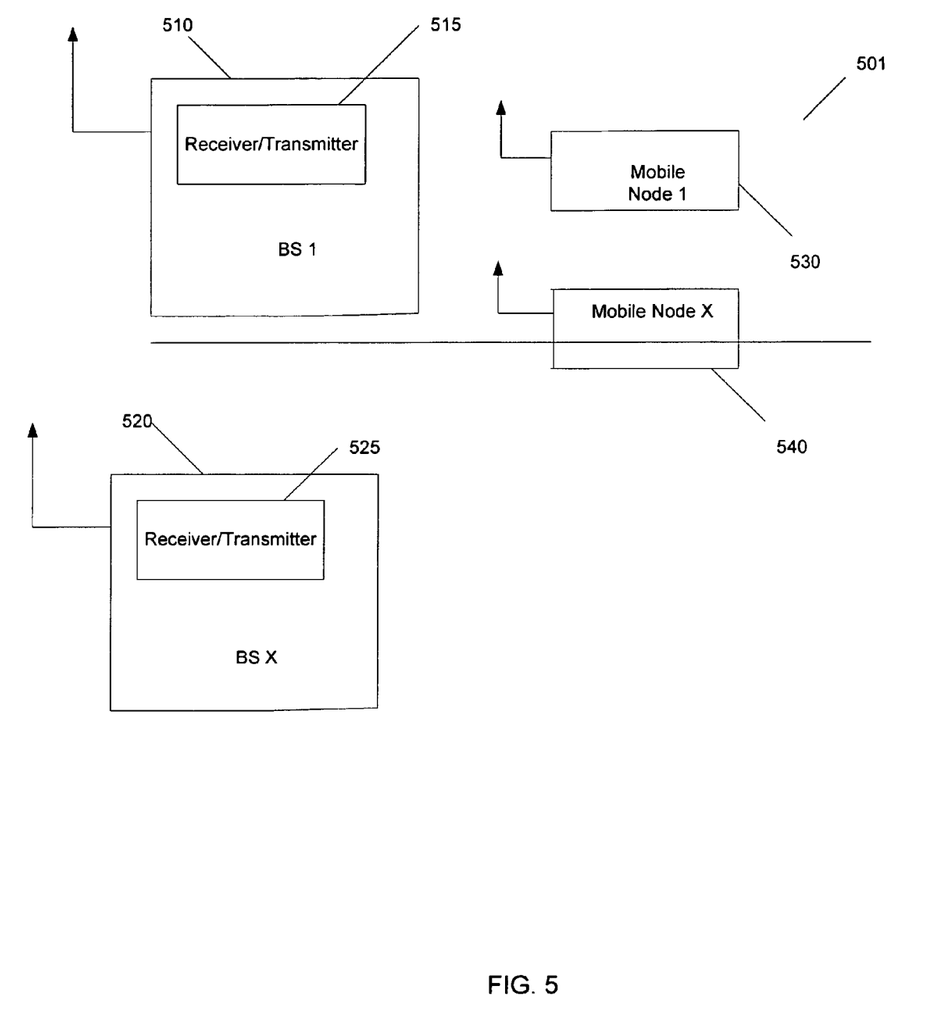
FIG. 5 illustrates a wireless system including an embodiment of the present invention.

FIG. 5 illustrates system that implements the present invention, according to an exemplary embodiment. The system 501 includes at least one base station 510. The base station 510, includes a transmitter 515. The transmitter 515 may in the form of a separate unit, part of a transmitter/receiver (transceiver) unit, or any other suitable means that are known in the art. The system further includes at least one mobile node 530. The mobile nodes 530 and 540, may be implemented as discussed above, but are configured to receive the first and second synchronization signals from the transmitter 515 of base station 510. The transmitter 515 transmits the synchronization signals to mobile nodes 530 and 540 that are in the coverage area. The base station 510 is configured to transmit the second synchronization signal at a bandwidth that is outside of a predetermined portion of the operating bandwidth of the network. For example, the predetermined portion may be a center portion of the operating bandwidth. The system 510 can also include a base station 520. The base station 520 can include a receiver/transmitter (transceiver) 525.

According to another embodiment of the present invention, the system discussed above may also be implemented as mobile node 540 enters into the coverage area of base station 510. In accordance to this exemplary embodiment of the present invention, the base station 510 may send a plurality of second synchronization signals to mobile nodes 530 and 540, or to any other mobile nodes that may be in the area.

One of average skill in the art will also recognize that the functional building blocks, and other illustrative blocks, modules and components herein, can be implemented as illustrated or by discrete components, application specific integrated circuits (ASIC), processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. An apparatus, comprising:
   a receiver unit configured to receive a first synchronization signal, wherein the first synchronization signal has a first operating bandwidth corresponding in size to at least an operating bandwidth of the receiver unit that is a predetermined portion of an operating bandwidth of a network;
   a synchronization unit configured to provide initial synchronization with the network,
   wherein the receiver unit is further configured to receive a second synchronization signal, wherein the second synchronization signal has a second operating bandwidth that is outside the first operating bandwidth of the first synchronization signal, wherein the second synchronization signal is provided in a different sequence than the first synchronization signal in a frequency domain, so that the second synchronization signal is not detected during the initial synchronization, wherein the second synchronization signal is configured to depend upon an expected number of narrowband mobile stations, and
   wherein the apparatus is further configured to perform neighbor cell identification based at least on the second synchronization signal.

2. The apparatus according to claim 1, wherein the receiver unit is configured to receive the second synchronization signal, wherein the second synchronization signal includes system information for a wireless network.

3. The apparatus according to claim 1, wherein the receiver unit is configured to receive the second synchronization signal, and wherein the neighbor cell identification is utilized for cell reselection.

4. The apparatus according to claim 3, wherein the receiver unit is configured to receive the second synchronization signal, and wherein the neighbor cell identification is further utilized for handover.

5. The apparatus according to claim 1, further comprising a second receiver unit configured to receive the second synchronization signal.

6. A method, comprising:
providing a first synchronization signal from a base station to a mobile node wherein the first synchronization signal has a first operating bandwidth corresponding in size to at least an operating bandwidth of the mobile node that is a predetermined portion of an operating bandwidth of a network;
providing a second synchronization signal from the base station to the mobile node, wherein the second synchronization signal has a second operating bandwidth that is outside the first operating bandwidth of the first synchronization signal, wherein the second synchronization signal is provided in a different sequence than the first synchronization signal in a frequency domain, so that the second synchronization signal is not detected during initial synchronization, and wherein the second synchronization signal is configured to depend upon an expected number of narrowband mobile stations;
identifying neighbor cells in the network based at least on the second synchronization signal; and
synchronizing the mobile node with the identified neighbor cells.

7. The method according to claim 6, wherein providing the second synchronization signal further comprises providing the second synchronization signal that is smaller than the operating bandwidth of the network.

8. The method according to claim 7, further comprising performing cell reselection based on the second synchronization signal.

9. The method according to claim 7, further comprising performing handover based on the second synchronization signal.

10. The method according to claim 6, further comprising providing system information in the second synchronization signal.

11. An apparatus, comprising:
at least one receiving means for receiving a first synchronization signal from a base station and a second synchronization signal from a base station, wherein the first synchronization signal has a first operating bandwidth corresponding in size to at least an operating bandwidth of the receiving means that is a predetermined portion of an operating bandwidth of a network, wherein the second synchronization signal has a second operating bandwidth that is outside the first operating bandwidth of the first synchronization signal, and wherein the second synchronization signal is configured to depend upon an expected number of narrowband mobile stations;
a synchronization means for performing initial synchronization with the network, wherein the second synchronization signal is provided in a different sequence than the first synchronization signal in a frequency domain, so that the second synchronization signal is not detected during the initial synchronization; and
an identification means for identifying a neighbor cell based at least on the second synchronization signal, wherein the apparatus is configured to provide synchronization with the identified neighbor cell.

12. The apparatus according to claim 11, wherein the at least one receiving means is configured to receive the second synchronization signal, wherein the second synchronization signal includes system information for a wireless network.

13. The apparatus according to claim 11, wherein the identification means identifies the neighbor cell for cell reselection.

14. The apparatus according to claim 13, wherein the identification means identifies the neighbor cell for handover.

15. The apparatus according to claim 11, wherein in the receiving means the second synchronization signal includes system information.

16. An apparatus, comprising:
a transmitter configured to transmit a first synchronization signal, wherein the first synchronization signal has a first operating bandwidth corresponding in size to at least an operating bandwidth of a mobile node that is a predetermined portion of an operating bandwidth of a network,
wherein the transmitter is further configured to transmit at least one second synchronization signal, wherein the at least one second synchronization signal has a second operating bandwidth that is outside the first operating bandwidth of the first synchronization signal, wherein the at least one second synchronization signal is provided in a different sequence than the first synchronization signal in a frequency domain, so that the at least one second synchronization signal is not detected during initial synchronization, and wherein the at least one second synchronization signal is configured to depend upon an expected number of narrowband mobile stations.

17. The apparatus according to claim 16, wherein the at least one second synchronization signal includes system information for a wireless network.

18. The apparatus according to claim 16, wherein the transmitter unit is configured to transmit a plurality of second synchronization signals.

19. A system, comprising:
a plurality of cells in a network;
a base station, wherein the base station comprises, a transmitter configured to transmit a first synchronization signal, wherein the first synchronization signal has a first operating bandwidth corresponding in size to at least an operating bandwidth of a mobile node that is a predetermined portion of an operating bandwidth of the network, and is further configured to transmit at least one second synchronization signal, wherein the at least one second synchronization signal has a second operating bandwidth that is outside the first operating bandwidth of the first synchronization signal, wherein the at least one second synchronization signal is provided in a different sequence than the first synchronization signal in a frequency domain, so that the at least one second synchronization signal is not detected during initial synchronization, and wherein the at least one second synchronization signal is configured to depend upon an expected number of narrowband mobile stations; and
a mobile node, wherein the mobile node comprises, a receiver unit configured to receive the first synchronization signal, and is configured to receive one of the at least one second synchronization signal,
wherein the mobile node identifies the cells in the network based at least on the received second synchronization signal.

* * * * *